United States Patent

Matsukura et al.

[11] Patent Number: 5,856,408
[45] Date of Patent: Jan. 5, 1999

[54] WATER DISPERSIBLE ACRYLIC BASED GRAFT COPOLYMERS, A METHOD OF MANUFACTURE AND AQUEOUS PAINTS

[75] Inventors: Yoshiaki Matsukura, Yokohama; Atsuhiro Sakai, Ebina, both of Japan; Hitoshi Taniguchi, West Bloomfield, Mich.; Yoshiaki Kawamura, Kamakura, Japan

[73] Assignee: BASF Lacke + Farben, AG, Muenster-Hiltrup, Germany

[21] Appl. No.: 803,581

[22] Filed: Feb. 20, 1997

Related U.S. Application Data

[63] Continuation of Ser. No. 776,425, Feb. 11, 1997, abandoned.
[51] Int. Cl.$^6$ .................. C08F 290/04; C08F 285/00; C09D 155/00
[52] U.S. Cl. .................. 525/301; 525/309; 525/311
[58] Field of Search .................. 525/301, 309, 525/311, 227

[56] References Cited

FOREIGN PATENT DOCUMENTS

WO 91/14712  3/1990  European Pat. Off. .
2 060 654  9/1980  United Kingdom .

Primary Examiner—Jeffrey C. Mullis

[57] ABSTRACT

Provided are aqueous paints with which paint films which have excellent paint film properties such as water resistance and resistance to chemical attack, and excellent finished appearance are obtained, and which have excellent painting operability and storage stability. The invention further provides water dispersible acrylic based graft copolymers, aqueous paints incorporating same and a method to make such paints, wherein an unsaturated bond-containing acrylic based copolymer (a) obtained by reacting an acrylic based copolymer (a1) of acid value 35–120 mg.KOH/gram, hydroxy group value 50–150 mg.KOH/gram, glass transition temperature −20°–+50° C. and number average molecular weight 4500–9000 and an unsaturated monomer mixture (a2), which has functional groups which can react with hydroxy groups, in a mol ratio of a2/a1=0.4–1.5, and a monomer composition (b) compounded in such a way that the acid value is not more than 15 and the hydroxy group value is 50–150 are reacted in the proportions by weight of a/b=10/90–60/40 to produce the claimed water dispersible acrylic based graft copolymer.

4 Claims, No Drawings

WATER DISPERSIBLE ACRYLIC BASED GRAFT COPOLYMERS, A METHOD OF MANUFACTURE AND AQUEOUS PAINTS

This case is a continuation of application Ser. No. 08/776,425, filed Feb. 11, 1997, now abandoned, which is hereby incorporated by reference in its entirety.

FIELD OF THE INVENTION

The invention concerns novel water dispersible acrylic based graft copolymers which are useful as the paint film-forming components of aqueous paints, having main chains which form a stabilized layer and side chains which form a diffused layer, a method for their manufacture, and aqueous paints which contain the aforementioned water dispersible acrylic based graft copolymers.

BACKGROUND OF THE INVENTION

Aqueous paints are excellent in terms of environmental protection and worker safety and so they are taking over from the solvent type paints. For example, a change from the solvent type metallic paints in which large amounts of organic solvent are used to aqueous metallic paints in which water is used for the solvent is in progress in the field of the metallic paints which are used to paint the outer panels of automobiles.

Random polymers which have carboxyl groups in the amounts required to make them compatible with water exist as aqueous resins which can be used generally in aqueous paints or aqueous paint compositions, and aqueous dispersions in which these polymers are dispersed in an aqueous medium and neutralized with a basic substance are being used as aqueous paints.

However, although the aqueous paints which consist of such an aqueous dispersion, for example the aqueous paints comprising an aqueous dispersion of acrylic based random polymer, have good pigment dispersion properties and paint fluidity and form paint films which have an excellent gloss and smoothness and they are suitable for providing a beautiful finish, the acrylic based polymers have a high acid value and so the water resistance of the paint film is low. Furthermore, the viscosity of an aqueous dispersion is high and so, when the aqueous paints obtained from them are adjusted to a viscosity which is suitable for painting, the solid fraction concentration becomes very low, and defects such as runs, holes and unevenness, for example, are liable to arise in the paint film during painting and during drying.

Aqueous paint compositions which contain acrylic based graft copolymers comprising hydrophilic components and hydrophobic components have been proposed for providing some improvement in these respects. For example, the manufacture of an acrylic based graft copolymer of acid value 15–40 and glass transition temperature −10° C.–70° C. by polymerizing an unsaturated group-containing acrylic based polymer of acid value 40–200, obtained by reacting a glycidyl group-containing unsaturated monomer with a carboxy functional acrylic based polymer, and a monomer composition in which α,β-ethylenic unsaturated carboxylic acid and other copolymerizable unsaturated monomers have been compounded in such a way that the acid value is not more than 30, the difference in the acid values of the two reaction components being 25–200, and aqueous paint compositions which contain aqueous dispersions of the acrylic based graft copolymers obtained as resin components, have been disclosed in Japanese Patent Kokai 56-49760.

Glycidyl group-containing unsaturated monomers are first reacted with a carboxy functional acrylic based copolymer in the method for the manufacture of the abovementioned acrylic based graft copolymers and the glycidyl groups undergo ring-opening addition with the carboxyl groups, and then the monomer composition is graft polymerized. However, in this method, the glycidyl groups only react specifically with carboxyl groups and so graft copolymers cannot be obtained from acrylic based copolymers which do not contain carboxyl groups, and so aqueous paints cannot be obtained. Furthermore, improvement in the painting operability is desirable with the aqueous paints which contain the abovementioned acrylic based graft copolymers.

SUMMARY OF THE INVENTION

The aim of this present invention is to provide novel and useful water dispersible acrylic based graft copolymers, which can be used as paint film-forming resins (principal resins) in aqueous paints, with which aqueous paints which can form films which have excellent paint film performance in terms of water resistance and resistance to chemical attack, for example, at this time and which have an excellent finished appearance, and which are excellent in terms of painting operability and storage stability, can be obtained.

A second aim of the invention is to provide a method of manufacture with which the abovementioned acrylic based graft copolymers can be manufactured efficiently and easily using acrylic based copolymers which contain hydroxy groups as starting materials.

A third aim of the invention is to provide aqueous paints which contain the abovementioned acrylic based graft copolymers, with which paint films which have excellent paint film performance in terms of water resistance and resistance to chemical attack, for example, and which have an excellent finished appearance can be formed, and which have excellent painting operability and storage stability.

The present inventions are the water dispersible acrylic based graft copolymers, a method for their manufacture and aqueous paints indicated below.

(1) Water dispersible acrylic based graft copolymer, characterized in that it is a graft copolymer obtained by reacting (a) an unsaturated bond-containing acrylic based copolymer, obtained by reacting an acrylic based copolymer (a1), being a copolymer of α,β-ethylenic unsaturated monomers, of acid value 35–120 mg.KOH/gram, hydroxy group value 50–150 mg.KOH/gram, glass transition temperature −20°–+50° C. and number average molecular weight 4500–9000, and an α,β-ethylenic unsaturated monomer (a2), which has functional groups which can react with hydroxy groups, in the proportions (a2)/(a1) (mol ratio)=0.4–1.5, and (b) a monomer composition in which copolymerizable unsaturated monomers have been compounded in such a way that the acid value is not more than 15 mg.KOH/gram and the hydroxy group value is 50–150 mg.KOH/gram, in the proportions (a)/(b) (ratio by weight)=10/90–60/40, having an acid value of 10–30 mg.KOH/gram, a hydroxy group value of 50–150 mg.KOH/gram, a glass transition temperature of −20°–+50° C. and a number average molecular weight of 10000–100000.

(2) Method for the manufacture of a water dispersible acrylic based graft copolymer, characterized in that (a) an unsaturated bond-containing acrylic based copolymer obtained by reacting an acrylic based copolymer (a1), being a copolymer of α,β-ethylenic unsaturated monomers, of acid value 35–120 mg.KOH/gram, hydroxy group value 50–150 mg.KOH/gram, glass transition temperature −20°–+50° C. and number average molecular weight 4500–9000, and an α,β-ethylenic unsaturated monomer (a2), which has functional groups which can react with hydroxy groups, in the proportions (a2)/(a1) (mol ratio)=0.4–1.5, and (b) a monomer composition in which copolymerizable unsaturated monomers have been compounded in such a way that the acid value is not more than 15 mg.KOH/gram and the hydroxy group value is 50–150 mg.KOH/gram, are reacted in the proportions (a)/(b) (ratio by weight)=10/90–60/40 to manufacture a water dispersible acrylic based graft copolymer which has an acid value of 10–30 mg.KOH/gram, a hydroxy group value of 50–150 mg.KOH/gram, a glass transition temperature of −20°–+50° C. and a number average molecular weight of 10000–100000.

(3) Aqueous paint, characterized in that it contains the acrylic based graft copolymer disclosed in (1) above.

DETAILED DESCRIPTION OF THE INVENTION

The water dispersible acrylic based graft copolymers of this invention (referred to hereinafter simply as acrylic based graft copolymers) are graft copolymers wherein a hydrophilic unsaturated bond-containing acrylic based copolymer (a) which is hydrated when dispersed in an aqueous medium and forms a stabilized layer forms the main chains, and a monomer component (b) is polymerized on this main chain and hydrophobic side chains which form a dispersed layer when dispersed are graft copolymerized via bonds such as urethane bonds for example.

In this invention, the terms "(meth)acrylic acid" and "(meth)acrylate" signify "acrylic acid and/or methacrylic acid" and "acrylate and/or methacrylate" respectively.

The acrylic based copolymer (a1) from which the unsaturated bond-containing acrylic based copolymer (a) is formed will be described first of all. The acrylic based copolymer (a1) is manufactured using hydroxy group-containing α,β-ethylenic unsaturated monomers and carboxyl group-containing α,β-ethylenic unsaturated monomers as essential components, with other copolymerizable unsaturated monomers which can be used, as required, along with these α,β-ethylenic unsaturated monomers, by means of the known solution polymerization method in the presence of a suitable polymerization initiator. Toluene, methyl isobutyl ketone, ethylene glycol monobutyl ether (butyl cellosolve), propylene glycol monopropyl ether or propylene glycol monoethyl ether, for example, can be used as the reaction medium.

Hydroxyalkyl esters of (meth)acrylic acid, such as 2-hydroxyethyl (meth)acrylate, 2-hydroxypropyl (meth) acrylate and 3-hydroxypropyl (meth)acrylate; the monoethers with polyether polyols such as polypropylene glycol of hydroxy group-containing α,β-ethylenic unsaturated monomers such as 2-hydroxyethyl (meth)acrylate; and lactone modified α,β-ethylenic unsaturated monomers in which 1–10 mol of a lactone such as ε-caprolactone or γ-butyrolactone has been added to the hydroxyalkyl ester of (meth)acrylic acid, can be cited as examples of the hydroxy group-containing α,β-ethylenic unsaturated monomer. These may be used individually, or they may be used in combinations of two or more types.

Esters: for example the $C_1$–$C_{18}$ alkyl esters of (meth) acrylic acid, such as methyl (meth)acrylate, ethyl (meth) acrylate, propyl (meth)acrylate, isopropyl (meth)acrylate, butyl (meth)acrylate, hexyl (meth)acrylate, octyl (meth) acrylate, and lauryl (meth)acrylate; the alkoxyalkyl esters of (meth)acrylic acid, such as methoxybutyl (meth)acrylate, methoxyethyl (meth)acrylate and ethoxybutyl (meth) acrylate; and the amides of acrylic acid or methacrylic acid: for example the amides of (meth)acrylic acid such as N-methylol(meth)acrylamide and N-isobutoxymethylol (meth)acrylamide; and vinyl aromatic compounds such as styrene, α-methylstyrene and vinyltoluene, for example, can be cited as other copolymerizable unsaturated monomers which can be used, as required.

The acrylic based copolymer (a1) is obtained using the monomers by carrying out solution polymerization in the usual way in the presence of a known polymerization initiator, such as azobisisobutyronitrile, benzyl peroxide, t-butyl peroxybenzoate, t-butyl peroxide, t-butyl peroxy-2-ethylhexanoate, for example. This reaction is carried out in such a way that the acrylic based copolymer (a1) which is formed has an acid value of 35–120 mg.KOH/gram, and preferably of 60–120 mg.KOH/gram, a hydroxy group value of 50–150 mg.KOH/gram, and preferably of 60–120 mg.KOH/gram, a glass transition temperature of −20°–+50° C., and preferably of −20°–+25° C., and a number average molecular weight of 4500–9000, and preferably of 4800–8500.

In cases where the acid value of the acrylic based copolymer (a1) is less than 35 mg.KOH/gram the copolymer is inadequate as a stabilizing layer, and the acrylic based graft copolymers obtained readily coagulate in an aqueous medium and the storage stability is poor, while in cases were it exceeds 120 mg.KOH/gram the copolymer is highly hydrophilic and the water resistance of a paint film which has been formed with an aqueous paint which contains the acrylic based graft copolymer obtained is poor.

In cases where the hydroxy group value of the acrylic based copolymer (a1) is less than 50 mg.KOH/gram there are too few crosslinking points between the acrylic based graft copolymer which is obtained and the amino resin which is used as a hardener and so the resistance to chemical attack of the paint film which is obtained is poor, while in cases where it exceeds 150 mg.KOH/gram it imparts a hydrophilic nature to the acrylic based graft copolymer which is obtained and the water resistance of a paint film which has been formed from an aqueous paint containing this graft copolymer is poor.

In cases where the glass transition temperature of the acrylic based copolymer (a1) is less than −20° C. the acrylic based graft copolymer obtained fuses easily in an aqueous medium and the storage stability of the aqueous dispersion is poor, while in those cases where it exceeds +50° C. the softening temperature of the acrylic based graft copolymer obtained is high and so the smoothness is poor when an aqueous paint in which it is included is formed into a paint film.

In cases where the number average molecular weight of the acrylic based copolymer (a1) is less than 4500 it is impossible to form a satisfactory stabilized layer and the storage stability of an aqueous dispersion of the acrylic based graft copolymer obtained is poor, while in cases where it exceeds 9000 the viscosity of an aqueous dispersion of the acrylic based graft copolymer obtained is high and the paint solid fraction of an aqueous paint which has been prepared with this is low, and the run properties are poor.

The unsaturated bond-containing acrylic based copolymer (a) is obtained by reacting an α,β-ethylenic unsaturated monomer (a2) which has functional groups which can react with hydroxy groups with the above-mentioned acrylic based copolymer (a1). α,α-Dimethylisopropenylbenzylisocyanate and methacryloylisocyanate, for example, can be cited as actual examples of the component (a2).

The reaction of (a1) and (a2) is carried out under conditions such that the mol ratio of (a2)/(a1) is 0.4–1.5, and preferably 0.8–1.2. Moreover, the number of mol of the acrylic based copolymer (a1) is determined by calculation from the number average molecular weight calculated as polystyrene measured in the usual way by means of gel permeation chromatography.

In cases where the amount of (a2) compounded with respect to the acrylic based copolymer (a1), as a mol ratio, is less than 0.4, the grafting reaction with the (b) component is inadequate and it is difficult to disperse the acrylic based graft copolymer which is obtained in an aqueous medium, or the storage stability of the aqueous dispersion which is obtained is poor, while gelling occurs in cases where it exceeds 1.5 and it is impossible to produce an acrylic based graft copolymer.

The reaction of (a1) and (a2) is preferably carried out in the presence of a catalyst such as dibutyltin diacetate, dibutyltin dilaurate or dibutyltin diacetonate for example.

The reaction of (a1) and (a2) can be carried out by reacting an acrylic based copolymer (a1), which has been manufactured separately, and the component (a2) in an appropriate reaction medium, or the component (a2) may be added to the reaction liquid in which the acrylic based copolymer (a1) has been manufactured and the reaction can be carried out following the manufacture of (a1). The same reaction media as used for the manufacture of (a1) can be used for the reaction medium.

The total concentration of the component (a1) and the component (a2) in the reaction liquid is 30–90 percent by weight, and preferably 50–80 percent by weight, and the concentration of catalyst in the reaction liquid is 0.1–5 percent by weight, and preferably 0.1–2 percent by weight. The reaction temperature is 20°–160° C., and preferably 40°–140° C., and the reaction time is preferably 0.5–5 hours.

In the abovementioned reaction, the hydroxy groups of the acrylic based copolymer (a1) and the functional groups which react with the hydroxy groups, for example the isocyanate groups, of the component (a2) react and form urethane bonds, the component (a2) is added on to the acrylic based copolymer (a1) as a result, and the unsaturated bond-containing acrylic based copolymer (a) is produced.

The monomer composition (b) which is reacted with the unsaturated bond-containing acrylic based copolymer (a) which has been obtained in this way is a composition in which copolymerizable unsaturated monomers have been compounded in such a way that the acid value is not more than 15 mg.KOH/gram, and preferably not more than 10 mg.KOH/gram, and the hydroxy group value is 50–150 mg.KOH/gram, and preferably 60–120 mg.KOH/gram.

The hydroxy groups containing α,β-ethylenic unsaturated monomers, carboxyl group-containing α,β-ethylenic unsaturated monomers and other copolymerizable monomers, for example, indicated as examples for the aforementioned acrylic based copolymer (a1), can be cited as copolymerizable unsaturated monomers.

In cases where the acid value of the monomer composition (b) exceeds 15 mg.KOH/gram, the acrylic based graft copolymer which is obtained becomes water soluble and the viscosity is increased, and the painting properties of an aqueous paint in which it is included are poor. Furthermore, the water resistance is also poor.

In cases where the hydroxy group value of the monomer composition (b) is less than 50 mg.KOH/gram there are insufficient crosslinking points between the amino resin which is used as a hardener and the acrylic based graft copolymer which is obtained, and so the resistance to chemical attack of the paint films obtained is poor, while in cases where it exceeds 150 mg.KOH/gram the copolymer is very hydrophilic and the water resistance of the paint films obtained is poor.

An acrylic based graft copolymer of this invention is obtained by reacting the aforementioned unsaturated bond-containing acrylic based copolymer (a) and the monomer composition (b). This reaction is carried out under conditions where the ratio of the unsaturated bond-containing acrylic based copolymer (a) and monomer composition (b), (a)/(b), (ratio by weight) is 10/90–60/40, and preferably 20/80–40/60.

In cases where (a)/(b) (ratio by weight) is less than 10/90 a satisfactory stabilized layer is not formed and the storage stability of an aqueous dispersion of the acrylic based graft copolymer obtained is poor, while in cases where it exceeds 60/40 the viscosity of an aqueous dispersion of the acrylic based graft copolymer obtained becomes very high and the paint solid fraction of an aqueous paint which contains the acrylic based graft copolymer is reduced and the run properties are poor.

The reaction of the unsaturated bond-containing acrylic based copolymer (a) and the monomer composition (b) can be carried out by reacting the component (a) which has been produced separately with the monomer composition (b) using the known methods of solution polymerization in an appropriate reaction medium, or the monomer composition (b) may be added to the reaction liquid in which the component (a) has been manufactured and the reaction may be carried out using the known methods of solution polymerization in an appropriate reaction medium following the manufacture of the component (a). The same reaction media as used for the manufacture of component (a) can be used for the reaction medium.

The reaction of component (a) and component (b) is preferably carried out in the presence of a polymerization initiator. The same polymerization initiators cited for the manufacture of the acrylic based copolymer (a1) can be used.

The total concentration of the component (a) and the monomer component (b) in the reaction liquid is 30–90 percent by weight, and preferably 50–80 percent by weight, and the polymerization initiator concentration with respect to the total weight of monomer is 0.1–10 percent by weight, and preferably 0.5–5 percent by weight. The reaction temperature is 20°–160° C., and preferably 40°–160° C., and the reaction time is preferably 1–10 hours.

The acid value, hydroxy group value, glass transition temperature and number average molecular weight of the acrylic based graft copolymer obtained can be adjusted by selecting, for example, the component (a) which is used, the type and amount of monomer composition (b) which is used, and the reaction conditions such as the reaction temperature, the reaction time and the type and amount of polymerization initiator which is used.

The abovementioned reaction involves carrying out a graft copolymerization by means of the radical polymerization of the monomer composition (b) on the unsaturated bonds in the component (a), and produces an acrylic based graft copolymer.

The acrylic based graft copolymers of this invention are graft copolymers which have been manufactured in the way described above, and they are water dispersible acrylic based graft copolymers which have an acid value of 10–30 mg.KOH/gram, and preferably of 15–30 mg.KOH/gram, a hydroxy group value of 50–150 mg.KOH/gram, and preferably of 60–120 mg.KOH/gram, a glass transition temperature of −20°–+50° C., and preferably of −10°–+25° C., and a number average molecular weight of 10000–100000, and preferably of 10000–50000.

In cases where the acid value of the acrylic based graft copolymer is less than 10 mg.KOH/gram it is difficult to disperse the copolymer in an aqueous medium and the storage stability is poor. Furthermore, in cases where it exceeds 30 mg.KOH/gram the viscosity of the aqueous dispersion obtained is very high and the paint solid fraction of an aqueous paint in which it is included is low, and the run properties are poor, and so the appearance of the paint film is poor. Furthermore, the water resistance of the paint film is poor.

In cases where the hydroxy group value of the acrylic based graft copolymer is less than 50 mg.KOH/gram there are insufficient crosslinking points between the amino resin which is used as a hardener and the acrylic based graft copolymer, and so the resistance to chemical attack of the paint films obtained is poor, while in cases where it exceeds 150 mg.KOH/gram the copolymer is very hydrophilic and the water resistance of the paint films obtained is poor.

In cases where the glass transition temperature of the acrylic based graft copolymer is less than −20° C. the acrylic based graft copolymer fuses easily in an aqueous medium and the storage stability of the aqueous dispersion is poor, while in those cases where it exceeds +50° C. the smoothness is poor when an aqueous paint in which the acrylic based graft copolymer is included is formed into a paint film.

In cases where the number average molecular weight of the acrylic based graft copolymer is less than 10000 the water resistance and resistance to chemical attack of paint films formed from an aqueous paint in which the acrylic based graft copolymer is included are poor. Furthermore, in those cases where it exceeds 100000 there is a possibility of gelling during the manufacture of an aqueous paint and this is undesirable. Furthermore, the smoothness of the paint films obtained is poor.

An aqueous dispersion can be obtained after manufacturing an acrylic based graft copolymer of this present invention by removing the solvent, neutralization with a basic substance and dispersion in an aqueous dispersion medium. The dispersion in an aqueous dispersion medium can be achieved using the usual methods, for example it can be carried out by neutralizing at least 40% of the carboxyl groups which are present in the acrylic based graft copolymer using an amine, such as dimethylethanolamine for example. A medium which contains 40–80 percent by weight of water is preferred for the aqueous dispersion medium.

An aqueous dispersion obtained in this way can be used as it is as an aqueous paint, or it may be concentrated or diluted, or it may be formed into a powder and then redispersed, to make an aqueous paint. The acrylic based graft copolymer can be used individually as the paint film-forming component of an aqueous paint, but the paint film performance is further improved when an aqueous paint (aqueous paint composition) is prepared by combining this as the main component with a hardener component, and this is preferred.

The use of amino resins, and especially amino resins of number average molecular weight not more than 1000, for the hardener is desirable. Examples of such amino resins include Saimeru 301, Saimeru 303, Saimeru 325 and Saimeru 327 (trade names, manufactured by the Mitsui Sairekku Co.), Nikarakku MW-30 and Nikarakku MX-43 (trade names, manufactured by the Sanwa Chemical Co.), and Yuuban 120 (trade name, manufactured by the Mitsui Toatsu Co.). Moreover, the number average molecular weight of the amino resin is the number average molecular weight calculated as polystyrene measured in the usual way by means of gel permeation chromatography.

Various hydrophilic organic solvents can be added, as required, to an aqueous paint of this present invention. Examples of such hydrophilic organic solvents include ethylene glycol monoethyl ether, ethylene glycol monobutyl ether, diethylene glycol monobutyl ether, ethylene glycol monohexyl ether, propylene glycol monomethyl ether, propylene glycol monoethyl ether and propylene glycol monobutyl ether.

Furthermore, metallic pigments, inorganic pigments and organic pigments, for example, can be added, as required. No particular limitation is imposed upon the method by which the pigment is added, and the addition can be made using the methods known in the past. Moreover, additives which have been added to aqueous paints conventionally, such as acid catalysts and surface levelling agents for example, can be compounded as required.

An aqueous paint of this present invention has very good storage stability and excellent painting operability, and the paint films obtained therefrom have excellent paint film performance in terms of water resistance, resistance to chemical attack, durability and smoothness.

The aqueous paints of this invention can be used as base coats and they can be formulated in the same way as the usual aqueous base coats in this case, and they can be used ideally in the two-coat one-bake painting systems as known in the past where the base coat and the top coat are painted on using a wet-on-wet system and both are baked at the same time.

Any method of painting, such as with a roll coater, brush painting or spray painting for example, can be used. The baking can be carried out for 10–60 minutes at 60°–180° C., and preferably for 15–30 minutes at 110°–150° C.

In this present invention, the effects described can be obtained when the various numerical values described so far, for example the property values of the acrylic based copolymer (a1) and the monomer composition (b), the reaction proportions, the reaction conditions, and the physical property values of the acrylic based graft copolymer, are within the numerical value ranges which have been disclosed, and especially good results can be obtained when all of the numerical values are within the numerical value ranges which have been disclosed as preferred ranges.

The water dispersible acrylic based graft copolymers of this invention are novel, and they are useful as paint film-forming resins in aqueous paints. The acrylic based graft copolymers of this invention are constructed with main chains which form a stabilized layer and side chains which form a dispersed layer and so they have excellent water dispersibility, and so when such acrylic based graft copolymers are used as paint film-forming resins in an aqueous paint the aqueous paint which is obtained does not coagulate and has excellent storage stability. Furthermore, an acrylic based graft copolymer of this invention is obtained by reacting in specified proportions the specified unsaturated bond-containing acrylic based copolymer (a) and the monomer composition (b), and it has specified physical property values, and so when such an acrylic based graft copolymer is used as a paint film-forming resin in an aqueous paint, the aqueous paint obtained has excellent painting operability and the paint films formed therefrom have excellent paint film performance, such as water resistance and resistance to chemical attack for example, and an excellent finished appearance.

The method of manufacture of the water dispersible acrylic based graft copolymers of this invention involves reacting in specified proportions the specified unsaturated bond-containing acrylic based copolymer (a) and the monomer composition (b), and so the abovementioned acrylic based graft copolymer can be manufactured easily and with good efficiency from an acrylic based copolymer (a) which contains hydroxy groups.

An aqueous paint of this invention contains the abovementioned acrylic based graft copolymer as a paint film-forming agent and so the painting operability and storage stability are excellent, and the paint films which are formed have excellent paint film performance in terms of water resistance and resistance to chemical attack, for example, and an excellent finished appearance.

ILLUSTRATIVE EXAMPLES

The invention is described in more detail below by means of illustrative examples, but the invention is not limited in any way by these examples. In the examples, the term "parts" signifies "parts by weight" unless there is an indication to the contrary. The method of painting and the methods of assessing paint film appearance, paint film performance and storage stability in each example were as indicated below.

METHOD OF PAINTING

Sheets as indicated below were used as test sheets for painting. Thus, cationic electrodeposition paint (trade name Akua No.4200, manufactured by the Nippon Yushi Co.) was electrodeposition painted so as to provide a dry film thickness of 20 m on a zinc phosphate treated steel sheet and baked for 20 minutes at a temperature of 185° C., and then a mid-coat paint (trade name Haiepico No.100 CP Sealer, manufactured by the Nippon Yushi Co.) was air spray coated so as to provide a dry film thickness of 40 m and baked for 20 minutes at 140° C. to form the test sheet.

The known two-coat one-bake system was used for painting the aqueous paint compositions prepared in each example onto the test sheets. That is to say, the aqueous paint composition was spray painted to provide a dry film thickness of about 15 m in a painting environment of temperature 25° C., relative humidity 75% and then it was hot dried for 10 minutes at 80° C., after which it was cooled to room temperature and a commercial top-coat clear paint (trade name Berukooto No. 6000, manufactured by the Nippon Yushi Co.) was spray painted so as to provide a dry film thickness of about 40 $\mu$m and, after setting for 10 minutes, the sheet was baked for 30 minutes at 140° C. The sheets for painting were maintained vertically throughout the whole process.

PAINT FILM APPEARANCE 1) 60° Gloss
Measured in accordance with JIS K 5400 (1990) 7.6: Mirror Surface Gloss.
2) Smoothness
The paint film was observed visually and assessed in accordance with the following standard levels.
O: Good
x: Poor
3) Run Properties
A hole of diameter 10 mm was opened up in the sheet for painting and an assessment was made on the basis of the standard levels indicated below from the length of the run below the hole on painting so as to provide a dry film thickness of 30 m.
O: Less than 2 mm
x: More than 2 mm

PAINT FILM PERFORMANCE

1) Water Resistance
The state of the paint surface after being immersed in hot water at a temperature of 90° C. or above for 4 hours was observed visually and an assessment was made on the basis of the following standard levels.
O: No change
x: Shrinkage occurred
2) Resistance to Chemical Attack
The state of the paint surface after being immersed in regular gasoline at a temperature of 40° C. for 1 hour was observed visually and an assessment was made on the basis of the following standard levels.
O: No change
x: Shrinkage occurred

STORAGE STABILITY

This was assessed by means of the fractional change (%) in the viscosity, with respect to the initial viscosity (ps/6 rpm (type B viscometer)) on storing the aqueous paint composition for 20 days at 40° C., and the assessment was made on the basis of the following standard levels.
O: Less than±15%
x: More than±15%

EXAMPLES 1–5

1) Preparation of Acrylic Based Graft Copolymers

Toluene (116.4 parts) was introduced into a reaction vessel which had been furnished with a stirrer, a temperature controller, a condenser and drip-feed apparatus; the temperature was raised, with stirring, and the toluene was refluxed. Next, a mixture of 41.8 parts 2-hydroxyethyl methacrylate, 18.5 parts acrylic acid, 64.3 parts n-butyl acrylate, 55.4 parts n-butyl methacrylate and 3.6 parts of azobisisobutyronitrile was added dropwise over a period of 2 hours. The mixture was then stirred under reflux for a further 2 hours and the polymerization was completed. (This reaction process is referred to hereinafter as "Process 1")

The resin obtained was an acrylic based copolymer of acid value 80 mg.KOH/gram, hydroxy group value 10 100 mg.KOH/gram, glass transition temperature 0° C. and number average molecular weight 4900.

Next, 0.1 part of dibutyltin dilaurate was introduced into this resin solution and, after cooling to 80° C., 7.4 parts of $\alpha,\alpha$-dimethylisopropenylbenzylisocyanate were introduced, with stirring, and the stirring was continued for 1 hour and the reaction was completed. (This reaction process is referred to hereinafter as "Process 2".)

Next, 266.2 parts of toluene were introduced into this resin solution and the mixture was stirred under reflux. Next, a mixture of 97.4 parts 2-hydroxyethyl methacrylate, 149.2 parts methyl methacrylate, 173.4 parts n-butyl acrylate and 6.3 parts azobisisobutyronitrile was added dropwise over a period of 2 hours. The polymerization was then completed by continuing the stirring for a further 5 hours. (This reaction process is referred to hereinafter as "Process 3".)

The acrylic based graft copolymer A-1 obtained was a resin solution which had an acid value of 24 mg.KOH/gram, a hydroxy group value of 96 mg.KOH/gram, a glass transition temperature of +7° C. and a number average molecular weight of 32000. The acrylic based graft copolymers A-2–A-5 were manufactured in the same way as described above using the formulations shown in Tables 1 to 3. The valves of the physical preperties and the like are given in Table 3.

TABLE 1

| Acrylic Based Graft Copolymer No. | (Parts by Weight) | | | | |
|---|---|---|---|---|---|
| | A - 1 | A - 2 | A - 3 | A - 4 | A - 5 |
| Process 1 | | | | | |
| Solvent | | | | | |
| Toluene | 116.4 | 155.2 | 97.7 | 77.0 | — |
| Methyl isobutyl ketone | — | — | — | — | 77.6 |
| Monomer Composition | | | | | |
| 2-Hydroxyethyl methacrylate | 41.8 | 33.4 | 41.8 | 22.3 | 22.3 |
| Acrylic acid | 18.5 | 21.6 | 15.4 | 12.3 | 18.5 |
| n-Butyl acrylate | 64.3 | 105.6 | 78.7 | 22.8 | 31.8 |
| n-Butyl methacrylate | 55.4 | 79.4 | — | 50.6 | 47.4 |
| 2-Ethylhexyl methacrylate | — | — | 14.1 | — | — |
| Styrene | — | — | — | 12.0 | — |
| Initiator | | | | | |
| Azobisisobutyronitrile | 3.6 | 4.8 | — | — | 2.4 |
| t-BPOEH *1 | — | — | — | 3.0 | — |
| t-Butyl peroxybenzoate | — | — | 2.3 | — | — |
| Reaction Temperature | Reflux | Reflux | Reflux | Reflux | Reflux |

TABLE 2

| Acrylic Based Graft Copolymer No. | (Parts by Weight) | | | | |
|---|---|---|---|---|---|
| | A - 1 | A - 2 | A - 3 | A - 4 | A - 5 |
| Process 3 | | | | | |
| Solvent | | | | | |
| Toluene | 266.2 | 220.9 | 285.0 | 305.4 | — |
| Methyl isobutyl ketone | — | — | — | — | 308.0 |
| Monomer Composition | | | | | |
| 2-Hydroxyethyl methacrylate | 97.4 | 66.9 | 125.3 | 89.1 | 66.9 |
| Acrylic acid | — | 4.6 | — | — | — |
| Methyl methacrylate | 149.2 | 136.4 | 113.1 | 171.1 | 235.8 |
| n-Butyl acrylate | 173.4 | 152.1 | 211.6 | 171.8 | 177.3 |
| Styrene | — | — | — | 48.0 | 13 |
| Initiator | | | | | |
| Azobisisobutyronitrile | 6.3 | — | — | — | 7.2 |
| t-BPOEH *1 | — | — | — | 9.6 | — |
| t-Butyl peroxybenzoate | — | 9.0 | 11.3 | — | — |
| Reaction Temperature | Reflux | Reflux | Reflux | Reflux | Reflux |

*1 t-BPOEH: t-Butylperoxy-2-ethylhexanoate

TABLE 3

| Acrylic Based Graft Copolymer No. | | A - 1 | A - 2 | A - 3 | A - 4 | A - 5 |
|---|---|---|---|---|---|---|
| Characteristic Values of the Acrylic Based Copolymer Obtained in Process 1 | Acid Value (mg.KOH/gram) | 80 | 70 | 80 | 80 | 120 |
| | Hydroxy Group Value (mg.KOH/gram) | 100 | 60 | 120 | 80 | 80 |
| | Glass Transition Temperature (°C.) | 0 | −10 | −15 | +20 | +10 |
| | Number Average Molecular Weight | 4900 | 4900 | 8500 | 4900 | 5100 |
| Characteristic Values of the Acrylic Based Copolymer Obtained in Process 3 | Acid Value (mg.KOH/gram) | 0 | 10 | 0 | 0 | 0 |
| | Hydroxy Group Value (mg.KOH/gram) | 100 | 80 | 120 | 80 | 60 |
| | Glass Transition Temperature (°C.) | +10 | +10 | 0 | +20 | +20 |
| Characteristic Values of the Acrylic Based Graft Copolymer | Acid Value (mg.KOH/gram) | 24 | 28 | 20 | 16 | 24 |
| | Hydroxy Group Value (mg.KOH/gram) | 96 | 67 | 118 | 78 | 62 |
| | Glass Transition Temperature (°C.) | +7 | +2 | −4 | +20 | +18 |
| | Number Average Molecular Weight | 32000 | 27000 | 45,000 | 38000 | 33000 |
| | Component (a)/Component (b) ratio by weight | 30/70 | 40/60 | 25/75 | 20/80 | 20/80 |
| | Component (a2)/Component (a1) mol ratio | 1.0 | 1.0 | 1.0 | 1.0 | 1.0 |

TABLE 1-continued

| Acrylic Based Graft Copolymer No. | (Parts by Weight) | | | | |
|---|---|---|---|---|---|
| | A - 1 | A - 2 | A - 3 | A - 4 | A - 5 |
| Process 2 | | | | | |
| Monomer | | | | | |
| α,α-Dimethylisopropenylbenzylisocyanate | 7.4 | 9.9 | 3.6 | 4.9 | 4.7 |
| Catalyst | | | | | |
| Dibutyltin dilaurate | 0.1 | 0.2 | 0.1 | 0.1 | 0.1 |
| Reaction Temperature | 80° C. | 80° C. | 80° C. | 80° C. | 80° C. |

*1 t-BPOEH: t-Butylperoxy-2-ethylhexanoate

2) Preparation of Aqueous Dispersions

Ethylene glycol monobutyl ether (80.0 parts) was added to 533.0 parts of the acrylic based graft copolymer A-1 obtained in 1) above and then 207.3 parts of toluene were distilled off by distillation under reduced pressure. Dimethylethanolamine (6.1 parts, 0.5 equivalents with respect to the carboxyl groups) was added to this polymer solution and the mixture was stirred, and then 588.2 parts of deionized water were added and the mixture was stirred until it became homogeneous, and the milk-white low viscosity aqueous dispersion B-1 of the acrylic based graft copolymer A-1 was obtained.

Furthermore, the aqueous dispersions B-2–B-5 of the acrylic based graft copolymers A-2–A-5 were obtained using the same method as described above with the formulations shown in Table 4. The properties of the aqueous dispersion obtained are shown in Table 4.

TABLE 4

| Aqueous Dispersion No. | | B - 1 | B - 2 | B - 3 | B - 4 | B - 5 |
|---|---|---|---|---|---|---|
| Type of Acrylic Based Graft Copolymer Used | | A - 1 | A - 2 | A - 3 | A - 4 | A - 5 |
| Amount of Acrylic Based Graft Copolymer Compounded | (parts by weight) | 533.0 | 533.0 | 533.0 | 533.0 | 533.0 |
| Ethylene Glycol Monobutyl Ether | (parts by weight) | 80.0 | 80.0 | 80.0 | 80.0 | 80.0 |
| Amount of Toluene Distilled Off under Reduced Pressure | (parts by weight) | 207.3 | 200.5 | 204.0 | 203.8 | — |
| Amount of Methyl Isobutyl Ketone Distilled Off Under Reduced Pressure | (parts by weight) | — | — | — | — | 205.5 |
| Dimethylethanolamine (parts by weight) | | 6.1 | 7.1 | 5.1 | 4.1 | 6.1 |
| Deionized Water (parts by weight) | | 588.2 | 580.4 | 585.9 | 586.7 | 586.4 |
| Properties of the Aqueous Dispersion Obtained | | Milk white low viscosity liquid | Milk white low viscosity liquid | Milk white low viscosity liquid | Milk white low viscosity liquid | Milk white low viscosity liquid |

3) Preparation of Aqueous Paint Compositions and Performance Tests

Aqueous paint compositions were prepared on the basis of the formulation shown in Table 5. That is to say, amino resin (trade name Saimeru 327, manufactured by the Mitsui Sairakku Co.), titanium dioxide (trade name Teika Rutile Type Titanium Dioxide JR602, manufactured by the Teika Co.), dimethylethanolamine and deionized water were added to the aqueous dispersions B-1–B-5 obtained in 2) above to prepare aqueous paint compositions of solid fraction 65 percent by weight. Deionized water was added to these aqueous paint compositions to adjust the viscosity measured using a B-type viscometer to 3±1 ps as a 6 rpm rotation viscosity and then they were evaluated using the methods described earlier.

The appearance of the paint films obtained and the results of the performance tests, and the results of the storage stability tests, are shown in Table 6.

TABLE 6

| Example No. | 1 | 2 | 3 | 4 | 5 |
|---|---|---|---|---|---|
| Dry Film Thickness | | | | | |
| Base coat ($\mu$m) | 15 | 15 | 16 | 15 | 16 |
| Clear coat ($\mu$m) | 40 | 41 | 40 | 41 | 41 |
| Painted Appearance | | | | | |
| 60° Gloss | 93 | 94 | 93 | 92 | 94 |
| Smoothness | ◯ | ◯ | ◯ | ◯ | ◯ |
| Run Properties | ◯ | ◯ | ◯ | ◯ | ◯ |
| Paint Film Performance | | | | | |
| Water resistance | ◯ | ◯ | ◯ | ◯ | ◯ |
| Resistance to chemical attack | ◯ | ◯ | ◯ | ◯ | ◯ |
| Storage Stability | ◯ | ◯ | ◯ | ◯ | ◯ |

TABLE 5

| Example No. | | 1 | 2 | 3 | 4 | 5 |
|---|---|---|---|---|---|---|
| Type of Aqueous Dispersion (parts by weight) | B - 1 | 328.1 | — | — | — | — |
| | B - 2 | — | 328.1 | — | — | — |
| | B - 3 | — | — | 328.1 | — | — |
| | B - 4 | — | — | — | 328.1 | — |
| | B - 5 | — | — | — | — | 328.1 |
| Dimethylethanolamine | (parts by weight) | 2.0 | 2.3 | 1.7 | 1.3 | 3.7 |
| Saimeru 327 | (parts by weight) | 50.0 | 50.0 | 50.0 | 50.0 | 50.0 |
| Titanium dioxide | (parts by weight) | 500.0 | 500.0 | 500.0 | 500.0 | 500.0 |
| Ethylene glycol monobutyl ether) | (parts by weight) | 50.0 | 50.0 | 50.0 | 50.0 | 50.0 |
| Deionized water | (parts by weight) | 69.9 | 69.6 | 70.2 | 70.6 | 68.2 |
| Deionized water for adjusting the viscosity | (parts by weight) | 43.3 | 74.3 | 23.6 | 15.6 | 38.3 |
| Total | | 1043.3 | 1074.3 | 1023.6 | 1015.6 | 1038.3 |
| Solid fraction | (weight %) | 62.3 | 60.5 | 63.5 | 64.0 | 62.6 |

COMPARATIVE EXAMPLES 1–7
1) Preparation of Acrylic Based Graft Copolymers

The acrylic based graft copolymers a-1–a-7 were prepared using the same method as in 1) of Examples 1–5 using the formulations shown in Tables 7 and 8. The property values etc. are shown in Table 9.

TABLE 7

| Acrylic Based Graft Copolymer No. | (Parts by Weight) | | | | | | |
|---|---|---|---|---|---|---|---|
| | a - 1 | a - 2 | a - 3 | a - 4 | a - 5 | a - 6 | a - 7 |
| Process 1 | | | | | | | |
| Solvent | | | | | | | |
| Toluene | — | 94.0 | 116.4 | — | 97.0 | 116.4 | — |
| Methyl isobutyl ketone | 116.4 | — | — | 114.6 | — | — | 97.0 |
| Monomer Composition | | | | | | | |
| 2-Hydroxyethyl methacrylate | 33.4 | 34.8 | 16.7 | 29.3 | 27.9 | 75.2 | 41.8 |
| Acrylic acid | 7.0 | 19.3 | 18.5 | 13.9 | 28.9 | 18.5 | 19.3 |
| n-Butyl acrylate | 53.9 | 56.2 | 56.4 | 123.0 | 43.8 | 38.6 | — |
| n-Butyl methacrylate | 85.7 | 39.7 | 88.4 | 13.8 | — | — | 47.8 |
| 2-Ethylhexyl methacrylate | — | — | — | — | 49.4 | 47.7 | 11.1 |
| Styrene | — | — | — | — | — | — | 30.0 |
| Initiator | | | | | | | |
| Azobisisobutyronitrile | 3.6 | — | — | — | 3.0 | 3.6 | — |
| t-BPOEH *1 | — | 6.0 | 3.6 | — | — | — | 3.0 |
| t-Butyl peroxybenzoate | — | — | — | 5.4 | — | — | — |
| Reaction Temperature | Reflux | Reflux | Reflux | Reflux | Reflux | Reflux | Reflux |
| Process 2 | | | | | | | |
| Monomer | | | | | | | |
| α,α-Dimethylisopropenylbenzyl-isocyanate | 7.4 | 9.2 | 7.0 | 7.5 | 6.0 | 7.4 | 5.9 |
| Catalyst | | | | | | | |
| Dibutyltin dilaurate | 0.1 | 0.2 | 0.1 | 0.1 | 0.1 | 0.1 | 0.1 |
| Reaction Temperature | 80° C. | 80° C. | 80° C. | 80° C. | 80° C. | 80° C. | 80° C. |

*1 t-BPOEH: t-Butylperoxy-2-ethylhexanoate

TABLE 8

| Acrylic Based Graft Copolymer No. | (Parts by Weight) | | | | | | |
|---|---|---|---|---|---|---|---|
| | a - 1 | a - 2 | a - 3 | a - 4 | a - 5 | a - 6 | a - 7 |
| Process 3 | | | | | | | |
| Solvent | | | | | | | |
| Toluene | — | 270.3 | 264.5 | — | 287.1 | 264.1 | — |
| Methyl isobutyl ketone | 266.2 | — | — | 261.9 | — | — | 285.0 |
| Monomer Composition | | | | | | | |
| 2-Hydroxyethyl methacrylate | 78.0 | 104.4 | 39.0 | 68.3 | 83.6 | 175.5 | 125.3 |
| Acrylic acid | — | — | — | — | — | — | — |
| Methyl methacrylate | 164.6 | 159.9 | 246.4 | 80.8 | 230.9 | 138.5 | 199.7 |
| n-Butyl acrylate | 177.4 | 185.7 | 134.6 | 270.9 | 135.5 | 106.0 | 35.0 |
| Styrene | — | — | — | — | — | — | 90.0 |
| Initiator | | | | | | | |
| Azobisisobutyronitrile | 6.3 | — | — | — | 6.8 | 8.4 | — |
| t-BPOEH *1 | — | 20.3 | 8.4 | — | — | — | 9.0 |
| t-Butyl peroxybenzoate | — | — | — | 10.5 | — | — | — |
| Reaction Temperature | Reflux | Reflux | Reflux | Reflux | Reflux | Reflux | Reflux |

*1 t-BPOEH: t-Butylperoxy-2-ethylhexanoate

TABLE 9

| Acrylic Based Graft Copolymer No. | | a - 1 | a - 2 | a - 3 | a - 4 | a - 5 | a - 6 | a - 7 |
|---|---|---|---|---|---|---|---|---|
| Characteristic Values of the Acrylic Based Copolymer Obtained in Process 1 | Acid Value (mg.KOH/gram) | 30 | 100 | 80 | 60 | 150 | 80 | 100 |
| | Hydroxy Group Value (mg.KOH/gram) | 80 | 100 | 40 | 70 | 80 | 180 | 120 |
| | Glass Transition Temperature (°C.) | 0 | 0 | 0 | −30 | 0 | +10 | +50 |
| | Number Average Molecular Weight | 4900 | 3300 | 5200 | 4800 | 5000 | 4900 | 5100 |
| Characteristic Values of the Monomer Composition Polymerized in Process 3 | Acid Value (mg.KOH/gram) | 0 | 0 | 0 | 0 | 0 | 0 | 0 |
| | Hydroxy Group Value (mg.KOH/gram) | 80 | 100 | 40 | 70 | 80 | 180 | 120 |
| | Glass Transition Temperature (°C.) | +10 | +10 | +30 | −20 | +30 | +30 | +70 |
| Characteristic Values of the Acrylic Based Graft Copolymer | Acid Value (mg.KOH/gram) | 9 | 25 | 24 | 18 | 38 | 24 | 25 |
| | Hydroxy Group Value (mg.KOH/gram) | 76 | 96 | 37 | 66 | 77 | 176 | 117 |
| | Glass Transition Temperature (°C.) | +7 | +10 | +24 | −23 | +22 | +24 | +65 |
| | Number Average Molecular Weight | 42000 | 9000 | 32000 | 31000 | 37000 | 31000 | 33000 |
| | Component (a)/Component (b) ratio by weight | 30/70 | 25/75 | 30/70 | 30/70 | 25/75 | 30/70 | 26/75 |
| | Component (a2)/Component (a1) mol ratio | 1.0 | 1.0 | 1.0 | 1.0 | 1.0 | 1.0 | 1.0 |

2) Preparation of Aqueous Dispersions

The aqueous dispersions b-1–b-7 of the acrylic based graft copolymers a-1–a-7 were prepared using the same method as in 2) of Examples 1–5 with the formulations shown in Table 10, using the acrylic based graft copolymers obtained in 1) above. Moreover, 588.6 parts of deionized water were added when the acrylic based graft copolymer a-1 was used and the mixture was stirred but, since the acid value of the component (a1) was too low, a sediment was produced and a stable aqueous dispersion could not be obtained (Comparative Example 1).

3) Preparation of Aqueous Paint Compositions and Performance Tests

Aqueous paint compositions were prepared in the same way as in 3) of Examples 1–5 on the basis of the formulation shown in Table 11, and they were evaluated in the same way as Examples 1–5. The results are shown in Table 12.

TABLE 10

| Aqueous Dispersion No. | b - 1 | b - 2 | b - 3 | b - 4 | b - 5 | b - 6 | b - 7 |
|---|---|---|---|---|---|---|---|
| Type of Acrylic Based Graft Copolymer Used | a - 1 | a - 2 | a - 3 | a - 4 | a - 5 | a - 6 | a - 7 |
| Amount of Acrylic Based Graft Copolymer Compounded (parts by weight) | 533.0 | 533.0 | 533.0 | 533.0 | 533.0 | 533.0 | 533.0 |
| Ethylene Glycol Monobutyl Ether (parts by weight) | 80.0 | 80.0 | 80.0 | 80.0 | 80.0 | 80.0 | 80.0 |
| Amount of Toluene Distilled Off under Reduced Pressure (parts by weight) | — | 194.2 | 203.0 | — | 204.7 | 202.8 | — |
| Amount of Methyl Isobutyl Ketone Distilled Off Under Reduced Pressure (parts by weight) | 203.9 | — | — | 200.7 | — | — | 203.6 |
| Dimethylethanolamine (parts by weight) | 2.3 | 6.3 | 6.1 | 4.6 | 9.6 | 6.1 | 6.3 |
| Deionized Water (parts by weight) | 588.6 | 574.9 | 583.9 | 583.1 | 582.1 | 583.7 | 584.3 |
| Properties of the Aqueous Dispersion Obtained | Dispersion in water impossible | Milk white low viscosity liquid | Milk white low viscosity liquid | Milk white viscosity liquid | High viscosity liquid | Milk white low viscosity liquid | Milk white low viscosity liquid |

TABLE 11

| Comparative Example No. | | 2 | 3 | 4 | 5 | 6 | 7 |
|---|---|---|---|---|---|---|---|
| Type of Aqueous Dispersion (parts by weight) | b - 2 | 328.0 | — | — | — | — | — |
| | b - 3 | — | 328.0 | — | — | — | — |
| | b - 4 | — | — | 328.0 | — | — | — |
| | b - 5 | — | — | — | 328.0 | — | — |
| | b - 6 | — | — | — | — | 328.0 | — |
| | b - 7 | — | — | — | — | — | 328.0 |
| Dimethylethanolamine | (parts by weight) | 2.1 | 2.0 | 1.5 | 3.2 | 2.0 | 2.1 |
| Saimeru 327 | (parts by weight) | 50.0 | 50.0 | 50.0 | 50.0 | 50.0 | 50.0 |
| Titanium dioxide | (parts by weight) | 500.0 | 500.0 | 500.0 | 500.0 | 500.0 | 500.0 |
| Ethylene glycol | (parts by weight) | 50.0 | 50.0 | 50.0 | 50.0 | 50.0 | 50.0 |

TABLE 11-continued

| Comparative Example No. | | 2 | 3 | 4 | 5 | 6 | 7 |
|---|---|---|---|---|---|---|---|
| monobutyl ether) | | | | | | | |
| Deionized water | (parts by weight) | 69.8 | 69.9 | 70.4 | 68.7 | 69.9 | 69.8 |
| Deionized water for adjusting the viscosity | (parts by weight) | 67.3 | 55.2 | 18.8 | 267.1 | 56.9 | 51.8 |
| Total | | 1067.3 | 1055.2 | 1018.8 | 1267.1 | 1056.9 | 1051.8 |
| Solid fraction | (weight %) | 60.9 | 61.6 | 63.8 | 51.3 | 61.5 | 61.8 |

TABLE 12

| Comparative Example No. | 2 | 3 | 4 | 5 | 6 | 7 |
|---|---|---|---|---|---|---|
| Dry Film Thickness | | | | | | |
| Base coat (μm) | 16 | 15 | 15 | 14 | 15 | 15 |
| Clear coat (μm) | 39 | 40 | 39 | 40 | 40 | 41 |
| Painted Appearance | | | | | | |
| 60° Gloss | 94 | 92 | 93 | 95 | 93 | 87 |
| Smoothness | ○ | ○ | ○ | ○ | ○ | X |
| Run Properties | ○ | ○ | ○ | X | ○ | ○ |
| Paint Film Performance | | | | | | |
| Water resistance | X | ○ | ○ | ○ | X | ○ |
| Resistance to chemical attack | X | X | ○ | ○ | ○ | ○ |
| Storage Stability | ○ | ○ | X | ○ | ○ | ○ |

As is clear from the results shown in Table 12, in Comparative Example 2 the number average molecular weight of the acrylic based graft copolymer was too low and so the water resistance and resistance to chemical attack of the paint film obtained were poor.

In Comparative Example 3 the hydroxy group value of the acrylic based graft copolymer was too low and so there were insufficient crosslinking points with the amino resin and the resistance to chemical attack of the paint film obtained was poor.

In Comparative Example 4 the glass transition temperature of the acrylic based graft copolymer was too low and so the storage stability of the aqueous paint composition was poor.

In Comparative Example 5 the acid value of the acrylic based graft copolymer was too high and so the paint solid fraction of the aqueous paint composition obtained was reduced and runs formed, and the paint film appearance was poor. Furthermore, the water resistance of the paint film obtained was also poor.

In Comparative Example 6 the hydroxy group value of the acrylic based graft copolymer was too high and the water resistance of the paint film obtained was poor.

In Comparative Example 7 the glass transition temperature of the acrylic based graft copolymer was too high and the smoothness of the paint film obtained was poor.

On the other hand, as shown in Table 6, the aqueous paint compositions of Examples 1–5 all provided an excellent finished appearance, excellent painting operability and excellent paint film performance and storage stability.

COMPARATIVE EXAMPLE 8

Methyl isobutyl ketone (76.4 parts) was introduced into a reaction vessel which had been furnished with a stirrer, a temperature controller, a condenser and drip feeding apparatus, and the temperature was raised, with stirring, and the toluene was refluxed. Next, a mixture of 27.9 parts 2-hydroxyethyl methacrylate, 12.3 parts acrylic acid, 16.9 parts n-butyl acrylate, 62.9 parts n-butyl methacrylate and 3.6 parts t-butyl peroxybenzoate was added dropwise over a period of 2 hours. The mixture was then stirred under reflux for a further 2 hours and the polymerization was completed. The resin obtained was an acrylic based copolymer of acid value 80 mg.KOH/gram, hydroxy group value 100 mg.KOH/gram, glass transition temperature +20° C. and number average molecular weight 4900.

Next, 0.1 part of dibutyltin dilaurate was introduced into this resin solution and, after cooling to 80° C., 4.9 parts of α,α-dimethylisopropenylbenzylisocyanate were introduced, with stirring, and the stirring was continued for 1 hour and the reaction was completed.

Next, 310.2 parts of methyl isobutyl ketone were introduced into this resin solution and the mixture was stirred under reflux. Next, a mixture of 111.4 parts 2-hydroxyethyl methacrylate, 228.8 parts methyl methacrylate, 139.8 parts n-butyl acrylate and 4.8 parts t-butyl peroxybenzoate was added dropwise over a period of 2 hours. The acid value of the mixture which was drip fed was 0 mg.KOH/g, the hydroxy group value was 100 mg.KOH/gram, and the ratio by weight of component (a)/component (b) was 20/80. The mixture was stirred after the drip feed but the design molecular weight of the acrylic based graft copolymer was too high and gelling occurred, and a graft copolymer was not produced.

COMPARATIVE EXAMPLE 9

Methyl isobutyl ketone (76.4 parts) was introduced into a reaction vessel which had been furnished with a stirrer, a temperature controller, a condenser and drip feeding apparatus, and the temperature was raised, with stirring, and the toluene was refluxed. Next, a mixture of 27.9 parts 2-hydroxyethyl methacrylate, 12.3 parts acrylic acid, 16.9 parts n-butyl acrylate, 62.9 parts n-butyl methacrylate and 3.6 parts t-butyl peroxybenzoate was added dropwise over a period of 2 hours. The mixture was then stirred under reflux for a further 2 hours and the polymerization was completed. The resin obtained was an acrylic based copolymer of acid value 80 mg.KOH/gram, hydroxy group value 100 mg.KOH/gram, glass transition temperature +20° C. and number average molecular weight 4900.

Next, 0.1 part of dibutyltin dilaurate was introduced into this resin solution and, after cooling to 80° C., 8.9 parts of α,α-dimethylisopropenylbenzylisocyanate were introduced, with stirring, and the stirring was continued for 1 hour and the reaction was completed.

Next, 299.0 parts of methyl isobutyl ketone were introduced into this resin solution and the mixture was stirred under reflux. Next, a mixture of 111.4 parts 2-hydroxyethyl methacrylate, 228.8 parts methyl methacrylate, 139.8 parts n-butyl acrylate and 12.0 parts t-butyl peroxybenzoate was added dropwise over a period of 2 hours. The acid value of the mixture which was drip fed was 0 mg.KOH/g, the hydroxy group value was 100 mg.KOH/gram, and the ratio by weight of component (a)/component (b) was 20/80. The mixture was stirred after the drip feed but the mol ratio of α,α-dimethylisopropenylbenzylisocyanate (a2)/(a1) was over 1.5 and so gelling occurred, and a graft copolymer was not produced.

We claim:

1. A water dispersible acrylic based graft copolymer, comprising the reaction product of
   (a) an unsaturated bond-containing acrylic based copolymer, comprising the reaction product of
      (a1) an acrylic based copolymer of α,β-ethylenic unsaturated monomers, having an acid value of between 35 and 120 mg.KOH/gram, a hydroxy group value of between 50 and 150 mg.KOH/gram, a glass transition temperature of between −20° and +50° C. and a number average molecular weight of between 4500 and 9000, and
      (a2) an α,β-ethylenic unsaturated monomer which does not contain a glycidyl group and has functional groups that can react with hydroxy groups, in a molar ratio of (a2)/(a1) of 0.4 to 1.5, and
   (b) a monomer composition of unsaturated monomers having an acid value of not more than 15 mg.KOH/gram, a hydroxy group value of between 50 and 150 mg.KOH/gram, and the weight ratio of (a)/(b) is between 10/90 and 60/40,
   wherein the water dispersible acrylic graft copolymer has an acid value of between 10 and 30 mg.KOH/gram, a hydroxy group value of 50 to 150 mg.KOH/gram, a glass transition temperature of −20° to +50° C. and a number average molecular weight of between 10000 and 100000.

2. A water dispersible acrylic based graft copolymer, comprising the reaction product of
   (a) an unsaturated bond-containing acrylic based copolymer, comprising the reaction product of
      (a1) an acrylic based copolymer of α,β-ethylenic unsaturated monomers, having an acid value of between 35 and 120 mg.KOH/gram, a hydroxy group value of between 50 and 150 mg.KOH/gram, a glass transition temperature of between −20° and +50° C. and a number average molecular weight of between 4500 and 9000, and
      (a2) an α,β-ethylenic unsaturated monomer selected from the group consisting of α,α-dimethylisopropenylbenzylisocyanate and methacryloylisocyanate, in a molar ratio of (a2)/(a1) of 0.4 to 1.5, and
   (b) a monomer composition of unsaturated monomers having an acid value of not more than 15 mg.KOH/gram, a hydroxy group value of between 50 and 150 mg.KOH/gram, and the weight ratio of (a)/(b) is between 10/90 and 60/40,
   wherein the water dispersible acrylic graft copolymer has an acid value of between 10 and 30 mg.KOH/gram, a hydroxy group value of 50 to 150 mg.KOH/gram, a glass transition temperature of −20° to +50° C. and a number average molecular weight of between 10000 and 100000.

3. An aqueous paint comprising the water dispersible acrylic based graft copolymer of claim 1.

4. A method for the manufacture of a water dispersible acrylic based graft copolymer, comprising reacting
   (a) an unsaturated bond-containing acrylic based copolymer, comprising the reaction product of
      (a1) an acrylic based copolymer of α,β-ethylenic unsaturated monomers, having an acid value of between 35 and 120 mg.KOH/gram, a hydroxy group value of between 50 and 150 mg.KOH/gram, a glass transition temperature of between −20° and +50° C. and a number average molecular weight of between 4500 and 9000, and
      (a2) an α,β-ethylenic unsaturated monomer which does not contain a glycidyl group and has functional groups that can react with hydroxy groups, in a molar ratio of (a2)/(a1) of 0.4 to 1.5, and
   (b) a monomer composition of unsaturated monomers compounded to have an acid value of not more than 15 mg.KOH/gram, and a hydroxy group value of between 50 and 150 mg.KOH/gram, in a weight ratio of (a)/(b) between 10/90 and 60/40, to obtain a water dispersible acrylic graft copolymer having an acid value of between 10 and 30 mg.KOH/gram, a hydroxy group value of 50 to 150 mg.KOH/gram, a glass transition temperature of −20° to +50° C. and a number average molecular weight of between 10000 and 100000.

* * * * *